(12) United States Patent
Ionson

(10) Patent No.: US 9,336,481 B1
(45) Date of Patent: May 10, 2016

(54) ORGANICALLY INSTINCT-DRIVEN SIMULATION SYSTEM AND METHOD

(71) Applicant: James Albert Ionson, Lexington, MA (US)

(72) Inventor: James Albert Ionson, Lexington, MA (US)

(*) Notice: Subject to any disclaimer, the term of this patent is extended or adjusted under 35 U.S.C. 154(b) by 0 days.

(21) Appl. No.: 14/611,592

(22) Filed: Feb. 2, 2015

(51) Int. Cl.
*G06N 3/00* (2006.01)
*G06N 5/04* (2006.01)

(52) U.S. Cl.
CPC . *G06N 3/006* (2013.01); *G06N 5/04* (2013.01)

(58) Field of Classification Search
CPC .................................. G06N 3/006; G06N 5/04
USPC ........................................................... 706/11
See application file for complete search history.

(56) References Cited

U.S. PATENT DOCUMENTS

| | | | | |
|---|---|---|---|---|
| 7,526,465 | B1* | 4/2009 | Forsythe | G06N 3/004 706/45 |
| 2002/0082077 | A1* | 6/2002 | Johnson | A63F 13/12 463/30 |
| 2005/0131978 | A1* | 6/2005 | Meredith | H04L 41/147 708/446 |
| 2008/0027692 | A1* | 1/2008 | Fables | G06N 3/004 703/6 |
| 2011/0178978 | A1* | 7/2011 | Parunak | G06N 7/06 706/52 |
| 2012/0185234 | A1* | 7/2012 | Visel | G06N 3/10 703/27 |
| 2014/0070947 | A1* | 3/2014 | Ionson | G06F 17/00 340/541 |
| 2014/0180994 | A1* | 6/2014 | Llobera | G06N 5/02 706/46 |

OTHER PUBLICATIONS

Laird J. et al., "A case study of knowledge integration across multiple memories in Soar", Biologically Inspired Cognitive Architectures, Apr. 2014, 8, pp. 93-99.*
Eberbach E., "Expressing Evolutionary Computation, Genetic Programming, Artificial Life, Autonomous Agents and DNA-Based Computing in $-Calculus—Revised Version", Nov. 2001.*
Hung V. et al., "Towards a Human Behavior Model Based on Instincts", Proceedings of BRIMS, 2007.*

* cited by examiner

*Primary Examiner* — Stanley K Hill
*Assistant Examiner* — Dave Misir

(57) ABSTRACT

An organically instinct-driven simulation system and method that enables organically instinct-driven simulation agents to intuitively, instinctively and logically anticipate future simulation states based upon inputs into the simulation; and proactively execute aggressive actions that are organically instinctive, forward looking, emotional and aggressively proactive resulting in a simulation that is more challenging to human participants. The system and method utilizes symbolic emotional and organically instinct-driven mathematical architectures; and inference processing algebras enabling instinct-driven simulation agents with the organically instinctive, predictive, aggressively proactive and the emotional behavior patterns of humans.

4 Claims, 1 Drawing Sheet

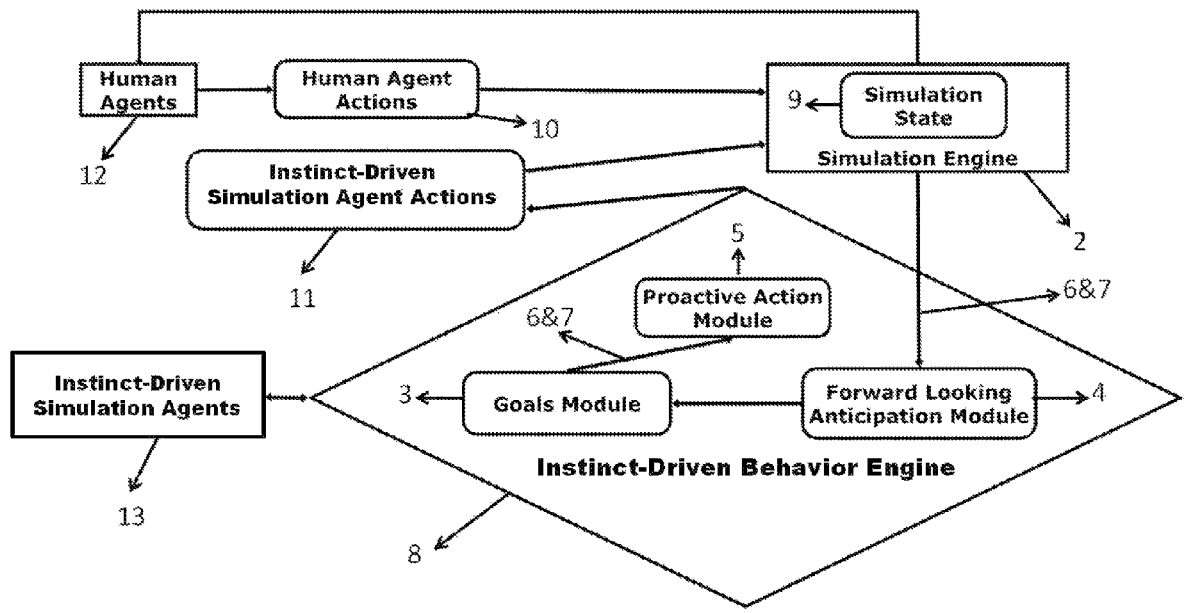

ORGANICALLY INSTINCT-DRIVEN SIMULATION SYSTEM AND METHOD

RELATED APPLICATIONS

The present application is related to U.S. Pat. No. 6,435,500, issued Aug. 20, 2002, for INTERACTIVE GAMES AND METHOD OF PLAYING, by Anthony Gumina, included by reference herein.

The present application is related to U.S. Pat. No. 7,025,675, issued Apr. 11, 2006, for VIDEO GAME CHARACTERS HAVING EVOLVING TRAITS, by David B. Fogel, Timothy J. Hays, Douglas R. Johnson, Thomas P. Lang Jr, included by reference herein.

The present application is related to U.S. Pat. No. 7,483,867, issued Jan. 27, 2009, for PROCESSING DEVICE WITH INTUITIVE LEARNING CAPABILITY, by Arif M. Ansari, Shiek Ansari, Yusuf M. Sulaimann included by reference herein.

The present application is related to U.S. Pat. No. 7,837,543 B2, issued Nov. 23, 2010, for REWARD-DRIVEN ADAPTIVE AGENTS FOR VIDEO GAMES, by Kurt Hartwig Graepel, Ralf Herbrich, Julian Gold, included by reference herein.

The present application is related to U.S. Pat. No. 8,001,067 B2, issued Aug. 16, 2011, for METHOD FOR SUBSTITUTING AN ELECTRONIC EMULATION OF THE HUMAN BRAIN INTO AN APPLICATION TO REPLACE A HUMAN, by Thomas A. Visel, Vijay Divar, Lukas K. Womack, Matthew Fettig, Hene P. Hamilton, included by reference herein.

The present application is related to U.S. Pat. No. 8,131,012, issued Mar. 6, 2012, for BEHAVIORAL RECOGNITION SYSTEM, by Eaton, et al., included by reference herein.

The present invention is related to U.S. Pat. No. 8,214,306, issued Jul. 3, 2012, for COMPUTER GAME WITH INTUITIVE LEARNING CAPABILITY, by Arif M. Ansari, Shiek Ansari, Yusuf Sulaiman, included by reference herein.

The present application is related to U.S. Pat. No. 8,210,945, issued Jul. 3, 2012, for SYSTEM AND METHOD FOR PHYSICALLY INTERACTIVE BOARD GAMES, by Ronen Horovitz, included by reference herein.

The present application is related to U.S. Pat. No. 8,219,509, issued Jul. 10, 2012, for PROCESSING DEVICE HAVING SELECTABLE DIFFICULTY LEVELS WITH INTUITIVE LEARNING CAPABILITY, by Arif M. Ansari, SHiek Ansari, Yusuf Sulaiman, included by reference herein.

The present application is related to U.S. Pat. No. 8,346,699, issued Jan. 1, 2013, for SYSTEM AND METHOD FOR SIMULATING CONSCIOUSNESS, by Gregory J. Czora, included by reference herein.

The present application is related to U.S. Pat. No. 8,346,646, issued Jan. 1, 2013, for FINANCIAL MARKET REPLICATOR AND SIMULATOR, by Stephen Cutler, William MacKenzie III, Evan Karl Cutler, Steven Davis, included by reference herein.

The present application is related to U.S. Pat. No. 8,856,057, issued Oct. 7, 2014, for COGNITIVE SECURITY SYSTEM AND METHOD, by James A. Ionson, included by reference herein.

The present application is related to U.S. Pat. No. 8,831,754, issued Sep. 9, 2014, for EVENT PREDICTION USING HIERARCHICAL EVENT FEATURES, by Michael J. Taylor, Vishwa Vinay, Yauhen Shnitko, included by reference herein.

This application claims the benefit of U.S. Provisional Application No. 62/022,707, filed Jul. 22, 2014 which is incorporated herein by reference in its entirety for all purposes.

OTHER PUBLICATIONS

Ivaylo Popov and Krasimir Popov, "Adaptive Cognitive Method", USPTO Publication #20140025612, January 2014

Patrick Soon-Shiong, "Reasoning Engines", USPTO Publication #20140129504, May 2014

Nikolaos Anastasopoulos, "Systems and Methods for Artificial Intelligence Decision Making in a Virtual Environment", USPTO Publication #20140279800, September 2014

John E. Laird, "The SOAR Cognitive Architecture", MIT Press, May 2012

Jitesh Dundas and David Chik, "Implementing Human-Like Intuition Mechanism in Artificial Intelligence", http://www.arxiv.org/abs/1106.5917, Jun. 29, 2011

Simon Butler and Yiannis Demiris, "Using Cognitive Architecture for Opponent Target Prediction", Proceedings of the Third International Symposium on AI & Games, Daniela M. Romano and David D. Moffat (Eds.), at the AISB 2010 convention, 29 Mar.-1 Apr. 2010, De Montifort University, Leicester, UK.

Robert P. Marinier III and John E. Laird, "Emotion-Driven Reinforcement Learning", http://sitemaker.umich.edu/marinier/files/marinier_laird_cogsci_2008_emotionrl.pdf Leonid I. Perlovsky and R. Kozma., Eds., "Neurodynamics of Higher-Level Cognition and Consciousness", ISBN 978-3-540-73266-2, Springer-Verlag, Heidelberg, Germany, 2007

Leonid I. Perlovsky, "Sapience, Consciousness, and the Knowledge Instinct. (Prolegomena to a Physical Theory)", In Sapient Systems, Eds. Mayorga, R, Perlovsky, L. I., Springer, London, 2007

Leonid I. Perlovsky, "Modeling Field Theory of Higher Cognitive Functions", Chapter III in "Artificial Cognition Systems, Eds. A. Loula, R. Gudwin, J. Queiroz. Idea Group, Hershey, Pa., pp. 64-105, 2006

Risto Miikkulainen, "Creating Intelligent Agents in Games", 12th U.S. Frontiers of Engineering, Volume 36, Number 4, 2006

Nils Goerke, "EMOBOT: A Robot Control Architecture Based on Emotion-Like Internal Values", Mobile Robots, Moving Intelligence (ed J. Buchli). ARS/pIV, Germany, 75-94, 2006

M. Salichs and M. Makfaz, "Using Emotions on Autonomous Agents. The Role of Happiness, Sadness and Fear" Adaptation in Artificial and Biological Systems (AISB'06), Bristol, England, 157-164, 2006

Eugene Eberbach, "$-Calculus of Bounded Rational Agents: Flexible Optimization as Search under Bounded Resources in Interactive Systems", Fundamentalnformaticae 68, 47-102, 2005

Bradley J. Harnish, "Reactive Sensor Networks (RSN)", AFRL-IF-RS-2003-245 Technical Report, Penn State University sponsored by DARPA and AFRL, 2003

Eugene Eberbach, "$-Calculus Bounded Rationality=Process Algebra+Anytime Algorithms", Applicable Mathematics: Its Perspectives and Challenges, Narosa Publishing House, New Delhi, Mumbai, Calcutta, 532-539, 2001

Eugene Eberbach and Shashi Phoha, "SAMON: Communication, Cooperation and Learning of Mobile Autonomous Robotic Agents, Proc. of the 11th IEEE. Conf. on Tools with Artificial Intelligence ICTAI'99, Chicago, Ill., 229-236, 1999

Canamero, "Modeling Motivations and Emotions as a Basis for Intelligent Behavior", Prd. First Int. Symp. on Autonomous Agents, AA, The ACM Press, 1997

J. D. Velasquez, "When Robots Weep: Emotional Memories and Decision-Making", Proc. 15th National Conference on Artificial Intelligence, AAAI Press, Madison, Wis., USA, 1997

Carlos Gershenson, "Behaviour-based Knowledge Systems: An Epigenetic Path from Behaviour to Knowledge", http://cogprints.org/2320/3/Gershenson-BBKS-Epigenetics.pdf A. R. Damasio, "Descartes' Error: Emotion, Reason and the Human Brain Robot", New York, USA: Picador, 1994

Chris Hoekstra, "Adaptive Artificially Intelligent Agents in Video Games: A Survey", http://www.bit-forge.com/studies/docs/Hoekstra_survey_adaptive_artificially_intelligent_agents_in_video_games.pdf Michael D. Byrne, "Cognitive Architectures in HCI: Present Work and Future Directions", http://chil.rice.edu/research/pdf/Bvrne_05.pdf

FIELD OF THE INVENTION

The present invention relates generally to machine behavior, and more specifically to simulations that enable simulation agents with organically instinctive, forward looking, predictive, emotional, and aggressively proactive behavior patterns that emulate the ability of humans to make decisions based upon intuition and instinct combined with logical reasoning.

BACKGROUND OF THE INVENTION

A major deficiency of simulations created for, but not limited to, entertainment such as video games and training applications such as military, aviation, medical and financial simulations, is the inability of simulation agents to intuitively, instinctively and logically predict future simulation states based upon unanticipated data inputs into the simulation; and respond with proactive aggressive actions which evolve the simulation in a manner that is more challenging and realistic for human participants. Prior art discloses systems and methods for simulation agents that are based primarily upon logic-driven models and algorithms, all of which break down when the simulation data falls outside of expected parameters and logical rules.

Essentially all current artificial intelligence methods focus on logical decision making and learning approaches based upon logical causes and effects related to past experiences and known scenarios. A number of methods assume the human mind behaves in a "logical" (e.g., Bayesian statistics) manner and makes decisions based upon probabilistic outcomes as described in U.S. Pat. No. 8,831,754, "Event Prediction Using Hierarchical Event Features", incorporated herein by reference in its entirety. There have been many other attempts to incorporate logical decision-making and learned behavior into simulation games created for, but not limited to, entertainment and training applications, through the use of pre-programmed databases and logical rules accessed by simulation agents; but these approaches result in limited behavioral responses and patterns by the simulation agents; and do not accurately emulate the organically instinctive, forward looking, predictive, emotional, and aggressively proactive behavior patterns that enable humans to make decisions based upon intuition and instinct combined with logical reasoning. For example, in video games the agents' actions are eventually anticipated by their human opponents thereby rendering the video game much less challenging to human opponents. Traditional video gaming agents are restricted to actions driven by pre-programmed logical rules which select from a pre-defined database of actions randomly or statistically, thereby making it impossible for the gaming agents to anticipate and adapt to unexpected changes in the human players' behavior during the game. More advanced "learning" approaches that implement an adaptive element to gaming agents have focused on pre-programmed; rule based reward-driven techniques as described in U.S. Pat. No. 7,837, 543 B2, "Reward-Driven Adaptive Agents for Video Games"; and dynamic and genetic scripting as described by "Adaptive Artificially Intelligent Agents in Video Games: A Survey" both incorporated herein by reference in their entirety. A similar approach is described in U.S. Pat. No. 7,025,675, "Video Game Characters Having Evolving Traits", incorporated herein by reference in its entirety, which uses a pre-programmed decision algorithm to assign "performance traits" such as speed, strength, lifetime, etc. to agents, as well as how these performance traits are utilized (e.g., aggressively or passively") based upon real time experiences of the simulation agents (e.g., injuries, achieved goals etc.). All of these approaches are based upon logical reasoning rules such as deductive reasoning, abductive reasoning, cause-based reasoning, inductive reasoning, metaphorical mapping and fuzzy logic (e.g. "Processing Device with Intuitive Learning Capability"; "Reasoning Engines"; Systems and Methods for Artificial Intelligence Decision Making in a Virtual Environment", which are incorporated herein by reference in their entirety). There have been additional disclosures related to simulating human consciousness such as described in U.S. Pat. No. 8,346,699, "System and Method for Simulating Consciousness", incorporated herein by reference in its entirety; but even these disclosures are based upon pre-programmed data sets with metrics defining "feelings", "actions" and "goals" which are correlated during the simulation to artificially replicate a form of limited consciousness which is limited by the spectrum of the data pre-programmed into the simulation.

None of these approaches enable the simulation with an organically instinctive, forward looking, predictive, emotional, and aggressively proactive behavior patterns that emulate the organically intuitive, instinctive and logical capabilities of humans, with the ability to anticipate, forecast, predict, and aggressively react to possible future game states that fall outside the spectrum of possibilities pre-programmed into the game; and proactively initiate aggressive actions that pre-empt these non-programmed future game states that would be detrimental to the simulation agents; and favor states that are more attractive to the simulation agents, thereby resulting in a simulation that is more challenging and realistic to human participants.

Similar issues exist with typical training simulations for military, aviation, medical and financial applications, to name a few, with scenarios that have been pre-programmed into the simulations thereby limiting the effectiveness of the training simulation to represent reality. One example is disclosed in U.S. Pat. No. 8,346,646, "Financial Market Replicator and Simulator", incorporated herein by reference in its entirety, which uses past financial market data pre-programmed into the simulation allowing users of the simulation to input simulated trades to test a trading strategy. This form of training does not reflect how the market changes as other external trades take place, whereas in real-life the financial market is a fully duplexed system which is constantly changing as internal and external trades influence one another. Therefore these kinds of "one way" training simulations do not effectively challenge and train the user to develop trading strategies where the real-time financial market data is rapidly changing do to other external factors, resulting in market data that is very different from that which was pre-programmed into the simulation. A financial organically instinct-driven simulation agent enabled with organically instinctive, forward looking, predictive, emotional and aggressively proactive capabilities would evolve the financial simulation in a manner that more accurately reflects what happens in an actual trading market, thereby offering a much more realistic and challenging training aid for human financial investors.

Therefore, there is a need for simulations to enable instinct-driven simulation agents with behavior patterns that are organically instinctive, forward looking, predictive, emotional and aggressively proactive through the use of mathematical methodologies and techniques that organically emulate the ability of humans to make decisions based upon intuition and instinct combined with logical reasoning, thereby enabling organically instinct-driven simulation agents to evolve the simulation in a more challenging and realistic manner for human participants; such as proactively initiating aggressive actions that pre-empt simulation states that are detrimental to the organically instinct-driven simulation agents in favor of simulation states that are more attractive to the organically instinct-driven simulation agents for entertainment applications; and initiating aggressive actions in training simulations that realistically evolves the simulation in a manner that is more challenging and realistic for human participants.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with the present invention, there is provided an organically instinct-driven simulation system and method that enables organically instinct-driven simulation agents to intuitively, instinctively and logically anticipate future simulation states through organic mathematical architectures and algebras that analyze and interpret data inputs into the simulation; and proactively initiate aggressive actions that evolve the simulation in a manner that is more challenging and realistic for human participants. (e.g., "Sapience, Consciousness, and the Knowledge Instinct. (Prolegomena to a Physical Theory)"; "Modeling Field Theory of Higher Cognitive Functions"; "Implementing Human-Like Intuition Mechanism in Artificial Intelligence"; "Behavior-Based Knowledge Systems: An Epigenetic Path from Behaviour to Knowledge"; "$-Calculus Bounded Rationality=Process Algebra+ Anytime Algorithms"; "$-Calculus of Bounded Rational Agents: Flexible Optimization as Search under Bounded Resources in Interactive Systems"; "Using Emotions on Autonomous Agents. The role of Happiness, Sadness and Fear"; "EMOBOT: A Robot Control Architecture Based on Emotion-Like Internal Values" which are all incorporated herein by reference in their entirety).

This invention comprises a simulation engine for providing simulation awareness to human agents and organically instinct-driven simulation agents by collecting data during the course of the simulation, analyzing, fusing, processing, and combinations thereof, the data to continuously provide awareness of the simulation state to human agents and organically instinct-driven simulation agents. Another key element of the invention is an organically instinct-driven behavior engine for enabling organically instinct-driven simulation agents with organically instinctive, forward looking, predictive, emotional and aggressively proactive behavior patterns through mathematical architectures and algebras that analyze and interpret data representing the state of the simulation thereby enabling human-like decisions based upon intuition and instinct combined with logical reasoning. The organically instinct-driven behavior engine learns from experiences as data and knowledge are accumulated, anticipates future actions, becomes aware of behavior patterns, responds to unexpected changes in the simulation state by utilizing mathematical architectures and processes that emulate the organically instinctive, forward looking, predictive, emotional and aggressively proactive behavior patterns of humans to make decisions based upon intuition and instinct combined with logical reasoning. Contained within the organically instinct-driven behavior engine is a forward looking anticipation module utilizing symbolic emotional and organically instinct-driven mathematical architectures; and inference process algebras for anticipating possible future simulation states based upon organic analysis of simulation data. This organic analysis leads to organically instinct-driven simulation agents' goals that evolve the simulation in a manner that is more challenging and realistic for human participants. Also included is a goals module for prioritizing new organically instinct-driven simulation agent goals that are designed to evolve the simulation in a manner that is more challenging and realistic for human participants; and a proactive action module utilizing symbolic emotional and organically instinct-driven mathematical architectures enabling the organically instinct-driven simulation agents to initiate organically instinctive, forward looking, predictive, emotional and aggressively proactive actions that achieve goals selected from the goals module. The provided system and method for simulations thereby enables organically instinct-driven simulation agents with organically instinctive, forward looking, predictive, emotional and aggressively proactive behavior patterns that emulate the ability of humans to make decisions based upon intuition and instinct combined with logical reasoning, resulting in a simulation that is more challenging and realistic for human participants.

BRIEF DESCRIPTION OF THE DRAWINGS

A complete understanding of the present invention may be obtained by reference to the accompanying drawings, when considered in conjunction with the subsequent, detailed description, in which:

FIG. 1 is a block diagram of an organically instinct-driven simulation system that enables organically instinct-driven simulation agents with organically instinctive, forward looking, predictive, emotional and aggressively proactive behavior patterns that emulate the ability of humans to make decisions based upon intuition and instinct combined with logical reasoning thereby resulting in a more challenging and realistic simulation for human participants. For purposes of clarity and brevity, like elements and components will bear the same designations and numbering throughout the FIGURE.

DESCRIPTION OF THE PREFERRED EMBODIMENT

To provide an overall understanding certain illustrative embodiments will be described; however, it will be understood by one skilled in the art of abstract mathematics such as symbolic emotional and organically instinct-driven mathematical architectures 7, and inference process algebras 6 (e.g., "Sapience, Consciousness, and the Knowledge Instinct. (Prolegomena to a Physical Theory)"; "Modeling Field Theory of Higher Cognitive Functions"; "Implementing Human-Like Intuition Mechanism in Artificial Intelligence"; "Behavior-Based Knowledge Systems: An Epigenetic Path from Behaviour to Knowledge"; "$-Calculus Bounded Rationality=Process Algebra+Anytime Algorithms"; "$-Calculus of Bounded Rational Agents: Flexible Optimization as Search under Bounded Resources in Interactive Systems"; "Using Emotions on Autonomous Agents. The role of Happiness, Sadness and Fear"; "EMOBOT: A Robot Control Architecture Based on Emotion-Like Internal Values" which are all incorporated herein by reference in their entirety) that the system and method described can be adapted and modified to provide systems and methods for other suitable applications and that additions and modifications can be made without departing from the scope of the system and method described herein.

FIG. 1 is a block diagram of an organically instinct-driven simulation system in accordance with an embodiment of the present invention. The primary function of this invention is to enable instinct-driven simulation agents 13 with organically instinctive, forward looking, predictive, emotional and aggressively proactive behavior patterns that emulate the ability of humans to make decisions based upon intuition and instinct combined with logical reasoning, resulting in a more challenging and realistic simulation for human participants. These behavior patterns enable organically instinct-driven simulation agents 13 with the ability to proactively execute actions that are organically instinctive, forward looking, predictive, emotional and aggressively proactive even when simulation data falls outside of logical expectations; and designed to evolve the simulation in a manner that results in a simulation that is more challenging and realistic for human participants. This system and method of execution by organically instinct-driven simulation agents 13 deviates from the more traditional approaches that are primarily based upon logical decision making rules and algorithms which breakdown when inputs into the simulation by human agents 12, simulation agents 13 and other sources fall outside of expected parameters and logical rules. As a consequence, these traditional systems simply react to actions and other inputs with, at best, learned behavior based upon past experiences, pre-programmed expectations and logical rules, all of which have extremely limited abilities to anticipate an unforeseen future simulation state 9 based upon data inputs which preprogrammed expectations and logical rules are unable to logically accommodate.

One component of this invention is an organically instinct-driven behavior engine 8 that utilizes symbolic emotional and organically instinct-driven mathematical architectures 7; and inference process algebras 6 such as, but not limited to, $-calculus which enables organically instinct-driven simulation agents 13 with organically instinctive, forward looking, predictive, emotional and aggressively proactive behavior patterns that emulate the ability of humans to make decisions based upon intuition and instinct combined with logical reasoning, resulting in a simulation that is more challenging and realistic for human participants. These symbolic emotional and organically instinct-driven mathematical architectures 7; and inference process algebras 6 enable the organically instinct-driven simulation agents 13 to intuitively, instinctively and logically infer possible future simulation states based upon simulation data such as actions by human agents 12, organically instinct-driven simulation agent actions 11 and other simulation inputs that fall outside logical expectations; and proactively execute aggressive organically instinct-driven simulation agent actions 11 that evolve the simulation in a manner that results in a simulation that is more challenging for human participants. The simulation state 9 is defined by analyzing and interpreting data residing in a simulation engine 2, the data being acquired by human agent actions 10, organically instinct-driven simulation agent actions 11 and other simulation inputs. Organically instinct-driven simulation agent actions 11 are driven by a proactive action module 5 which enables the organically instinct-driven simulation agents 13 to achieve prioritized goals from the goals module 3 by selecting organically instinctive, logical and aggressively proactive actions from an expanded set of possible aggressive actions resulting from mathematical analysis and interpretation of the simulation state 9 and inputs from a continuously updated forward looking anticipation module 4. The forward looking anticipation module 4 establishes an evolving set of anticipated simulation states based upon the simulation state 9 and mathematical analysis and interpretation of possible future simulation states based upon human agent actions 10, organically instinct-driven simulation agent actions 11 and other external inputs to the simulation. Mathematical analysis is accomplished through the use of symbolic emotional and organically instinct-driven mathematical architectures 7; and inference process algebras 6 such as, but not limited to $-calculus. These algebras and mathematical architectures have built-in cost optimization mechanisms allowing them to deal with nondeterminism, incomplete and uncertain information. In particular, $-calculus is a higher-order polyadic process algebra with a "cost" utility function, such as an expectation that certain human agent actions 10 and other simulation inputs will be executed as the simulation progresses. These mathematical techniques have been successfully applied to the Office of Naval research SAMON robotics testbed to derive GBML (Generic Behavior Message-passing Language) for behavior planning, control and communication of heterogeneous Autonomous Underwater Vehicles (AUV's) (e.g., SAMON: Communication, Cooperation and Learning of Mobile Autonomous Robotic Agents which is incorporated herein by reference in its entirety). In addition, $-calculus has also been used in the DARPA Reactive Sensor Networks Project at ARL Penn. State university for empirical cost profiling (e.g., "Reactive Sensor Networks (RSN)" which is incorporated herein by reference in its entirety) with $-calculus expressing all variables as cost expressions: the environment, multiple communication/interaction links, inference engines, modified structures, data, code and meta-code. One of the cost functions used in this invention might be "uncertainty" within the organically instinct-driven behavior engine 8 which operates using an internal values system that depends upon the simulation state 9 as well as anticipated changes to the simulation state 9 that could occur as a function of human agent actions 10, organically instinct-driven simulation agent actions 11 and other simulation inputs. Another feature of the organically instinct-driven behavior engine 8 is its internal value system which is designed to operate in accordance with psychological terms that humans associate with "drives" and "emotions" (e.g. as discussed in "Using Emotions on Autonomous Agents. The role of Happiness, Sadness and Fear"; "EMOBOT: A Robot Control Architecture Based on Emotion-Like Internal Values" which are both incorporated herein by reference in their entirety). These internal values do not actually realize real "drives" and "emotions", but the organically instinct-driven behavior engine 8 operates in such a way that it exhibits behavior that is governed by "drives" and "emotions" in a manner that emulates the organically instinctive, logical and emotional behavior patterns of humans, and responds to dynamic changes in the simulation state 9 just as humans might. Specifically, the "emotional" state of the organically instinct-driven behavior engine 8 is strongly influenced by psychological internal values simulated by, for example, "happiness" when the organically instinct-driven simulation agent actions 11 change the simulation state 9 in favor of the organically instinct-driven simulation agents 13 and "anger" when human agent actions 10 and/or other simulation inputs change the simulation state 9 to one that is less desirable to the organically instinct-driven simulation agents 13. These internal values are used to help define the "emotional state" of the organically instinct-driven behavior engine 8 through the use of symbolic emotional and organically instinct-driven mathematical architectures 7; and inference process algebras 6 which autonomously updates in real time the forward looking anticipation module 4. The forward looking anticipation module 4 receives data from the simulation engine 2 and utilizes symbolic emotional and organically instinct-driven mathematical architectures 7; and inference process algebras 6 to anticipate possible future simulation states which determines organically instinct-driven simulation agents 13 goals that would, for example, pre-empt an anticipated simulation state 9 that would be detrimental to the organically instinct-driven simulation agents 13 in favor of a simulation state 9 that are more favorable to the organically instinct-driven simulation agents 13. Based upon analysis within the forward looking anticipation module 4, the goals module 3 prioritizes these new organically instinct-driven simulation agents 13 goals which drive the proactive action module 5 thereby enabling the organically instinct-driven simulation agents 13 with organically instinctive, forward looking, predictive, emotional and aggressively proactive actions necessary to achieve the prioritized goals. The proactive action module 5 utilizes symbolic emotional and organically instinct-driven mathematical architectures 7; and inference process algebras 6 that drive organically instinct-driven simulation agents 13 actions in real-time in an attempt to enhance the "emotional well being" of the organically instinct-driven simulation agents 13 through the achievement of goals that result in a simulation state 9 that is more favorable to the organically instinct-driven simulation agents 13, with "anger" driving proactive behavior designed to evolve the simulation state 9 in favor of the organically instinct-driven simulation agents 13 thereby advancing the emotional state of the organically instinct-driven behavior engine 8 from "angry" to "happy". This invention results in a simulation experience that is much more challenging and realistic for human participants.

An embodiment is provided that relates to a video paintball game of capture the flag where human agents 12 and organically instinct-driven simulation agents 13 compete to capture a flag in the middle of the playing field and bring the flag back to their goal without all players being eliminated by hits from the opponents paintball guns. The initial simulation state 9 has both the human agents 12 and organically instinct-driven simulation agents 13 starting at their own respective ends of the playing field with the flag posted in the middle of the field. Experienced players are trained to identify weaknesses in the opposing teams' placement of players on the field and aggressively take advantage of those weaknesses to further weaken the area by eliminating as many players as possible in that region in order to enable a full breach which allows a contingent of attacking players to move behind players from the opposing team, thereby engaging them in battle which detracts their attention away from the flag. During this phase of the game an attacking player held in reserve is able to capture the flag while the rest of the players are engaged in battle. Referring to FIG. 1, the simulation state 9 associated with the simulation engine 2 provides simulation awareness to the organically instinct-driven simulation agents 13 enabling the organically instinct-driven behavior engine 8 to access the forward looking anticipation module 4 which utilizes symbolic emotional and organically instinct-driven mathematical architectures 7; and inference process algebras 6 to anticipate future undesirable simulation states and enables the proactive action module 5 to select from the goals module 3 specific goals that exploit weaknesses associated with the human agents 12 configuration on the playing field. These goals continuously evolve as the simulation state 9 advances due to proactive organically instinct-driven simulation agent actions 11, human agent actions 10 and other simulation inputs. Organically instinct-driven simulation agent actions 11 are driven by the proactive action module 5 where symbolic emotional and organically instinct-driven mathematical architectures 7 are used to enhance the "emotional well being" of the organically instinct-driven simulation agents 13 as the simulation state 9 becomes more favorable towards the organically instinct-driven simulation agents 13. These organically instinct-driven simulation agent actions 11 and the responding human agent actions 12 evolve the simulation state 9 which is then utilized by the organically instinct-driven behavior engine 8 to aggressively drive proactive organically instinct-driven simulation agent actions 11 in a manner than continues to enhance the "emotional" well being of the organically instinct-driven simulation agents 13 until a favorable evolution of the simulation state 9 is achieved. This interactive process enables the organically instinct-driven simulation agents 13 to continuously anticipate the evolution of the simulation state 9 and plan organically instinct-driven simulation agent actions 11 that constantly place the human agents 12 in a defensive mode with the ultimate goal of the organically instinct-driven simulation agents 13 winning the game.

Another embodiment is provided that relates to video game poker where human agents 12 play against organically instinct-driven simulation agents 13 representing video game agents. The rules of poker are very well defined but the key to winning is the ability to anticipate the strength of the hand that the opponent holds and wager accordingly. Typical video game agents simply play according to a specific set of pre-programmed logical rules and a logical analysis of the number of cards dealt from the deck as well as the specific value of the cards that are seen by all players. Unlike typical video game agents, organically instinct-driven simulation agents 13 in this provided embodiment are organically instinctive, logical and capable of reading "tells" of human opponents which are associated with biometric behavior patterns, timing of the human opponents wager as well as the size of the wager. This data is collected by the simulation engine 2 and defines the simulation state 9 which is analyzed within the organically instinct-driven behavior engine 8. Specifically, this data is analyzed by the forward looking anticipation module 4 to anticipate the playing pattern of the human opponents such as betting, checking, calling or folding; and utilizes symbolic emotional and organically instinct-driven mathematical architectures 7; and inference process algebras 6 to anticipate human opponents playing behavior based upon analysis related to whether or not the human opponents actually have superior hands or are simply trying to represent superior hands by bluffing. The forward looking anticipation module 4 also enables the proactive action module 5 to select from the goals module 3 specific goals that place the human opponents in a defensive mode with organically instinct-driven simulation agent actions 11 being driven by the proactive action module 5 where symbolic emotional and organically instinct-driven mathematical architectures 7 are used to emulate the organically instinctive, forward looking, predictive, emotional and aggressively proactive behavior patterns of humans. The organically instinct-driven simulation system continues to collect data as the simulation evolves and through the organically instinct-driven behavior engine 8 drives organically instinct-driven simulation agent actions 11 in a manner that continues to enhance the "emotional" well being of the organically instinct-driven simulation agents 13 until a favorable simulation state 9 is achieved with the ultimate goal being the organically instinct-driven simulation agents 13 winning the poker hand.

Another practical embodiment relates to training simulations such as those used by the military to train commanders to effectively engage an enemy that is organically instinctive, forward looking, emotional and aggressively proactive. In this embodiment the organically instinct-driven simulation agents 13 would represent the enemy and the human agents 12 would represent the human commander with other "commander controlled" simulation agents representing the commander's forces. Typical military training simulations are pre-programmed with known scenarios encountered from the real life experiences of operational commanders. Although these simulations can be quite effective in training commanders to operate successfully if they encounter scenarios in actual operations that they encountered in the simulation, they are quite ineffective in training the commander to operate successfully when encountering scenarios that were not included in the simulation training database. In this embodiment the forward looking anticipation module 4 would analyze simulation data through use of symbolic emotional and organically instinct-driven mathematical architectures 7; and inference process algebras 6 which would anticipate possible simulation states that would not be in favor of the organically instinct-driven simulation agents 13. This processed data would then populate the goals module 3 with a set of prioritized organically instinct-driven simulation agents 13 goals that would pre-empt undesirable simulation states in favor of states that are more favorable to the organically instinct-driven simulation agents 13. These goals would be achieved through aggressive, proactive actions generated by the proactive action module 5 which would use symbolic emotional and organically instinct-driven mathematical architectures 7 to emulate the organically instinctive, forward looking, predictive, emotional and aggressively proactive behavior patterns of humans. This provided embodiment of an organically instinct-driven simulation system would expose and train the human commander to effectively respond to a vast spectrum of scenarios that more accurately represents what a commander would face in real life operations.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An organically instinct-driven simulation system that enables organically instinct-driven simulation agents with organically instinctive, forward looking, predictive, emotional, and aggressively proactive behavior patterns that emulate the ability of humans to make decisions based upon intuition and instinct, combined with logical reasoning, thereby enabling organically instinct-driven simulation agents to evolve a simulation in a more challenging manner for human participants, comprising:
    a software, firmware, hardware and combinations thereof organically instinct-driven behavior engine, for incorporating organically instinctive, forward looking, predictive, emotional and aggressively proactive behavior into the actions of organically instinct-driven simulation agents through mathematical analysis of simulation data by utilizing mathematical techniques of cost calculus ($-calculus) that emulate the organically instinctive, forward looking, predictive, emotional and aggressive proactive behavior patterns of humans to make decisions based upon intuition and instinct combined with logical reasoning, thereby driving organically instinct-driven simulation agent actions that evolves the simulation in a more challenging manner for human participants;
    a software, firmware, hardware and combinations thereof simulation engine, for providing simulation awareness to human agents and organically instinct-driven simulation agents by collecting data and analyzing, fusing, processing, and combinations thereof, the data to continuously communicate a state of the simulation to human agents and organically instinct-driven simulation agents;
    a software, firmware, hardware and combinations thereof forward looking anticipation module, for anticipating possible future simulation states based upon analysis of simulation data thereby leading to identification of organically instinct-driven simulation agents goals that evolves the simulation in a more challenging manner for human participants;
    a software, firmware, hardware and combinations thereof goals module, for prioritizing new organically instinct-driven simulation agents goals that evolves the simulation in a more challenging manner for human participants; and
    a software, firmware, hardware and combinations thereof proactive action module, for enabling the organically instinct-driven simulation agents with aggressive proactive actions that achieve goals which evolves the simulation in a more challenging manner for human participants.

2. The organically instinct-driven simulation system as recited in claim 1 further comprising:
    a set of inference process algebras, for analyzing data generated by the simulation in a manner that emulates the organically instinctive, forward looking, predictive processing abilities of humans.

3. The organically instinct-driven simulation system as recited in claim 1, further comprising:
    a set of symbolic emotional and organically instinct-driven mathematical architectures, for analyzing simulation data in a manner that emulates the organically instinctive, forward looking, predictive, emotional and aggressively proactive behavior patterns of humans.

4. A method for simulations that enables organically instinct-driven simulation agents to predict future simulation states and execute aggressive proactive actions that evolves the simulation in a manner that is more challenging for human participants comprising the steps of:
    Providing simulation awareness to human agents and organically instinct-driven simulation agents by collecting data, analyzing, fusing, processing, and combinations thereof, the data to continuously communicate the state of the simulation to human agents and organically instinct-driven simulation agents;

Utilizing mathematical techniques of cost calculus ($-calculus) that emulate organically instinctive, forward looking, predictive, emotional and aggressively proactive behavior and processing abilities of humans to make decisions based upon intuition and instinct combined with logical reasoning, thereby enabling organically instinct-driven simulation agents to anticipate future actions, be aware of behavior patterns, respond to unexpected changes in the simulation environment, and combinations thereof, as data and knowledge are accumulated;

Identifying and prioritizing organically instinct-driven simulation agents' goals that will evolve the simulation in a more challenging manner for human participants;

Utilizing mathematical techniques of cost calculus ($-calculus) that emulate the organically instinctive, forward looking, predictive, emotional and aggressively proactive behavior and processing abilities of humans to enable organically instinct-driven simulation agents with aggressive proactive actions that achieve goals which will evolve the simulation in a more challenging manner for human participants.

* * * * *